(12) United States Patent
Tsuji et al.

(10) Patent No.: US 6,385,261 B1
(45) Date of Patent: May 7, 2002

(54) IMPULSE NOISE DETECTOR AND NOISE REDUCTION SYSTEM

(75) Inventors: Masayuki Tsuji; Masahiro Tsujishita; Kenichi Taura; Masayuki Ishida, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/233,173

(22) Filed: Jan. 19, 1999

(30) Foreign Application Priority Data

Jan. 19, 1998 (JP) ............................. 10-007849

(51) Int. Cl.[7] .......................... H03D 1/04; H03D 1/06; H03K 5/01; H04B 1/10; H04L 1/00
(52) U.S. Cl. ..................... 375/346; 375/254; 375/278; 375/284
(58) Field of Search ................. 375/346, 317, 375/345, 284, 278, 254; 455/223, 222, 501, 296

(56) References Cited

U.S. PATENT DOCUMENTS

| | | | |
|---|---|---|---|
| 5,260,974 A | * 11/1993 | Johnson et al. | ............. 375/317 |
| 6,138,093 A | * 10/2000 | Ekudden et al. | ............. 704/228 |
| 6,178,314 B1 | * 1/2001 | Whikehart et al. | ...... 455/188.1 |

FOREIGN PATENT DOCUMENTS

| | | | | |
|---|---|---|---|---|
| EP | 0208082 A2 | 1/1987 | ............ | H03G/3/34 |
| EP | 0377965 A2 | 7/1990 | ............ | H03G/3/34 |
| JP | 63182916 | 7/1998 | ............ | H04B/1/10 |

* cited by examiner

*Primary Examiner*—Mohammad H. Ghayour

(57) ABSTRACT

An impulse noise detector detects impulse noise in an audio signal by filtering out the audio components of the signal, then comparing an envelope of a filtered signal with a threshold obtained as a moving average of the envelope. Short-duration impulse noise is thereby detected without detecting tone bursts and other fast-rising signals of longer duration. The envelope may be taken directly from the filtered signal, or from a difference signal obtained from a preliminary envelope of the filtered signal, to emphasize impulse noise when distorted audio components leak into the filtered signal.

23 Claims, 11 Drawing Sheets

IMPULSE NOISE DETECTOR AND NOISE REDUCTION SYSTEM

BACKGROUND OF THE INVENTION

The present invention relates to an impulse noise detector useful in, for example, a car radio.

Impulse noise such as ignition noise and mirror noise occurs frequently in the car environment, and is readily picked up by the antenna of a car radio. To prevent such impulse noise from becoming audible, a car radio requires an impulse noise reducer.

FIG. 1 is a block diagram of a frequency-modulation (FM) stereo car radio comprising an antenna 1, a tuner 2, an FM demodulator (DEMOD) 3, an impulse noise reducer 4, an impulse noise detector 5, an FM stereo demodulator 6, and a pair of loudspeakers 7 (only one of which is visible). An FM radio-frequency broadcast signal received by the antenna 1 is selected and amplified by the tuner 2, then demodulated by the FM demodulator 3 to obtain an FM composite signal. The FM composite signal includes a left-right sum component with audio frequencies up to fifteen kilohertz (15 kHz), a 19-kHz pilot component, and a left-right difference component amplitude-modulated around a 38-kHz carrier frequency, with an upper sideband extending to 53 kHz. Impulse noise picked up by the antenna 1 may also be present, but this noise is detected by the impulse noise detector 5 and blanked out by the impulse noise reducer 4. Further demodulation of the FM composite signal by the FM stereo demodulator 6 produces right-channel and left-channel audio signals, which are reproduced through the loudspeakers 7.

FIG. 2 shows the internal structure of an impulse noise reducer 4 and an impulse noise detector 5 employed in the prior art. The FM composite signal is received at an analog input terminal 8. The impulse noise detector 5 comprises a high-pass filter (HPF) 9, an amplifier (AMP) 10, an automatic-gain-control (AGC) circuit 11, and a monostable multivibrator 12. The impulse noise reducer 4 comprises a gate 13. The high-pass filter 9 has a cutoff frequency high enough to reject all of the above-mentioned components of the FM composite signal. Impulse noise includes still higher frequency components that are not rejected. The output of the high-pass filter 9, which comprises impulse noise and other noise, is amplified by the amplifier 10, the gain of which is controlled by the AGC circuit 11 so as to keep the amplified noise signal below the threshold of the monostable multivibrator 12. The AGC circuit 11 is designed to respond slowly to changes in the noise level, however. When impulse noise occurs, the monostable multivibrator 12 cannot track the rapid rise in the noise level, so the output of the amplifier 10 triggers the monostable multivibrator 12, which outputs an impulse noise detection signal to the gate 13. The output of the gate 13 is held constant while the impulse noise detection signal is active, so impulse noise is effectively suppressed.

One problem in this prior-art circuit is that the monostable multivibrator 12 is triggered not only by impulse noise, which typically lasts only a few tens or a few hundreds of microseconds, but also by tone-burst signals, in which a sine-wave signal lasting several milliseconds is preceded and followed by a signal with zero amplitude. The result is the unwanted blanking of these tone bursts.

Another problem is that intermodulation distortion can cause some of the energy of the composite FM signal to leak into frequency bands above 53 kHz, affecting the operation of the AGC circuit 11 and making accurate detection of impulse noise difficult.

SUMMARY OF THE INVENTION

It is accordingly an object of the present invention to detect impulse noise lasting for brief intervals of time, while avoiding the detection of signals that appear abruptly but last for longer intervals.

Another object of the invention is to detect impulse noise accurately in the presence of leakage of audio signal components caused, for example, by intermodulation.

The invented method of detecting impulse noise comprises the following steps:

high-pass or bandpass filtering of an input signal;

detecting an envelope of the filtered signal;

calculating a first average value of at least some of the values of the envelope signal over a predetermined time interval;

multiplying the first average value by a first factor to obtain a threshold value;

comparing at least one value of the envelope signal in the predetermined time interval with the threshold value;

activating an impulse noise detection signal if the compared value exceeds the threshold value; and de-activating the impulse noise detection signal if the compared value does not exceed the threshold value.

In one aspect of the invention, all values of the envelope signal in the predetermined time interval are used in calculating the first average value.

In another aspect of the invention, the values used in calculating the first average value are those that do not exceed the product of a second average of all of the values in the predetermined time interval, multiplied by a second factor.

In another aspect of the invention, the envelope signal is obtained by detecting a preliminary envelope, taking differences of values in the preliminary envelope, then detecting the envelope of the difference values.

In another aspect of the invention, the steps described above are performed twice, using bandpass filters with different passbands, and the two resulting impulse noise detection signals are combined in different ways, depending on the received level of a radio-frequency signal from which the input signal is obtained, to generate an output impulse noise detection signal.

In another aspect of the invention, the first factor is adjusted according to the received level of the radio-frequency signal.

The invention also provides impulse noise detectors and a noise reduction system employing the invented method.

By using a multiple of the envelope signal averaged over a time interval as a detection threshold, the invented method detects short-duration impulse noise without detecting abruptly rising signals of longer duration.

By taking an envelope of differences of a preliminary envelope, the invented method emphasizes impulse noise, relative to intermodulation products and other audio leakage, so that the impulse noise can be accurately detected.

DETAILED DESCRIPTION OF THE INVENTION

Figure 1:
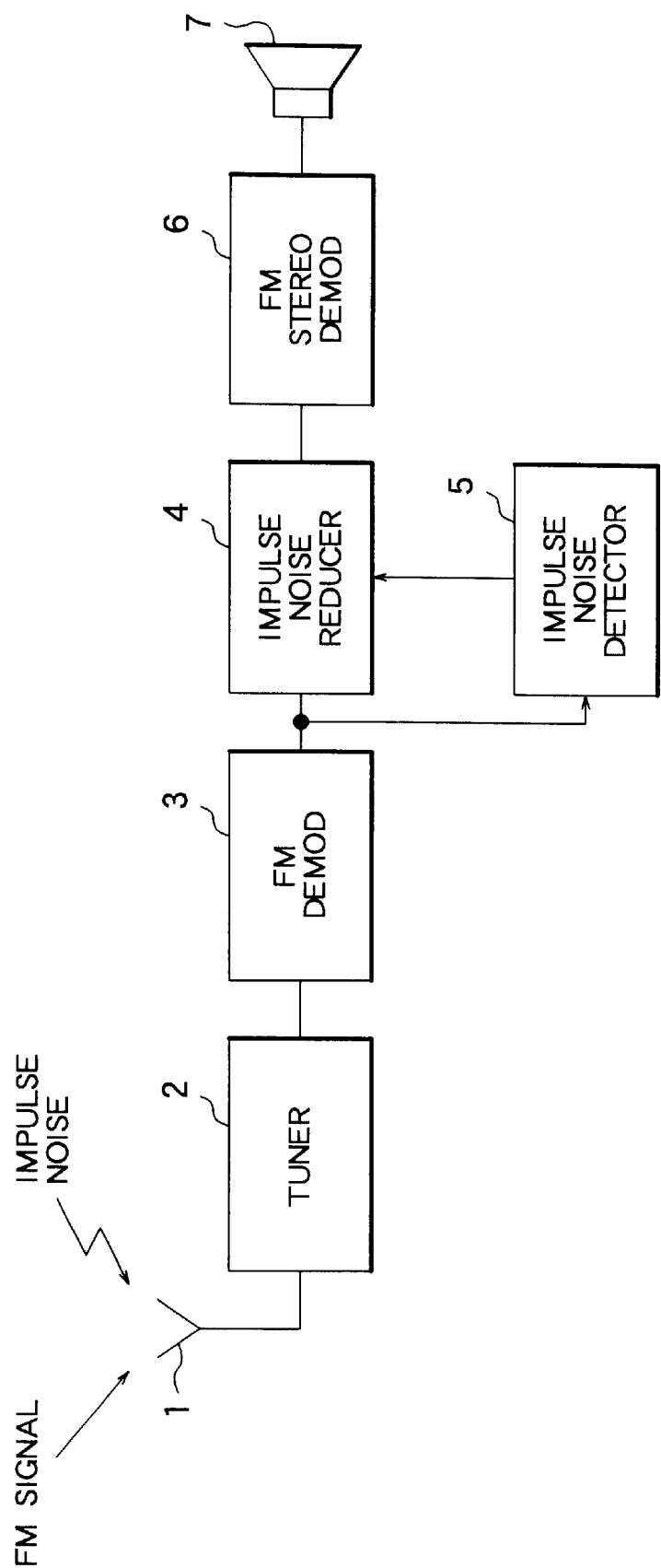
FIG. 1 is a block diagram of an FM stereo radio receiver.
Figure 2:
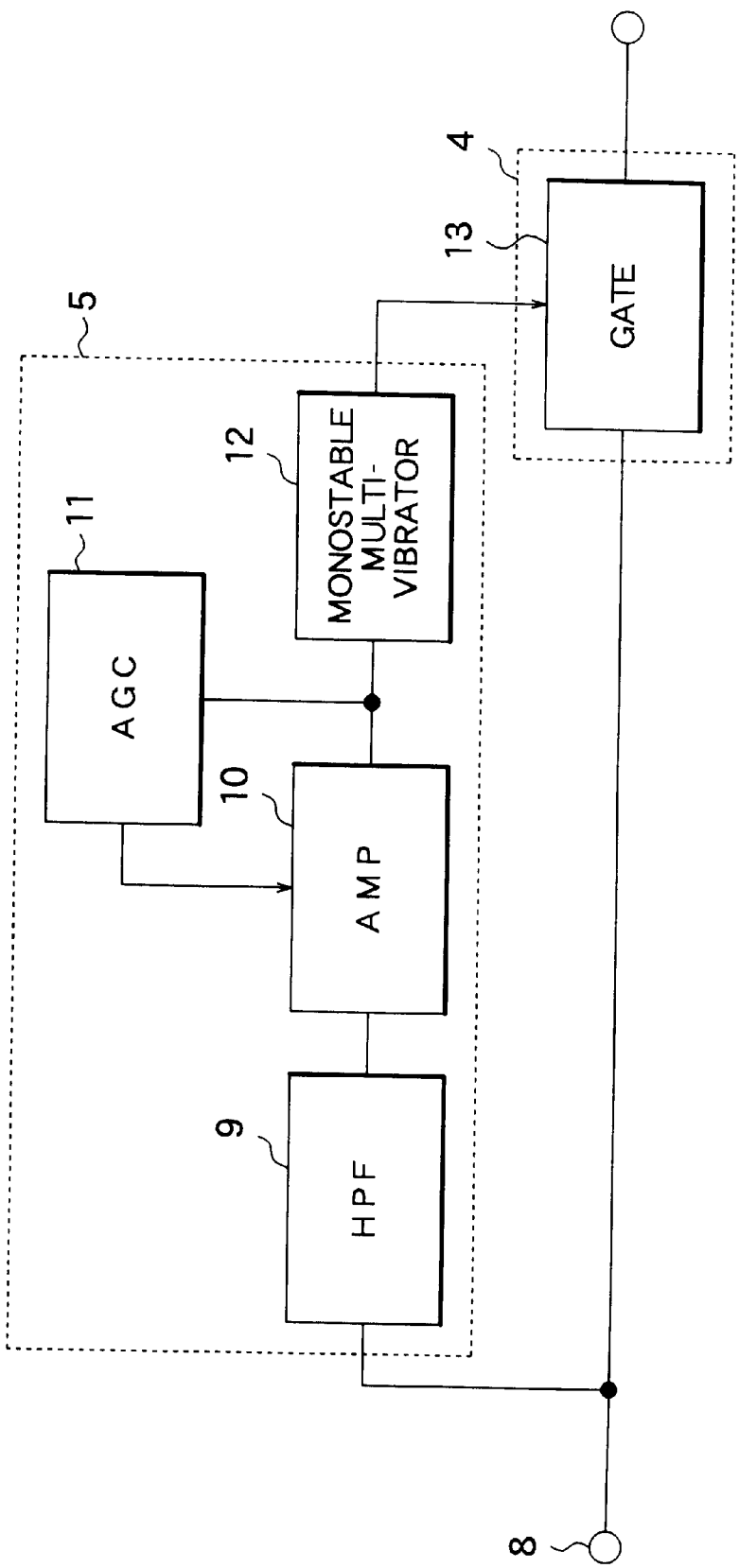
FIG. 2 is a more detailed block diagram showing the internal structure of a prior-art impulse noise detector.

Embodiments of the invention will be described with reference to the attached drawings, in which like parts are indicated by like reference characters.

Figure 3:
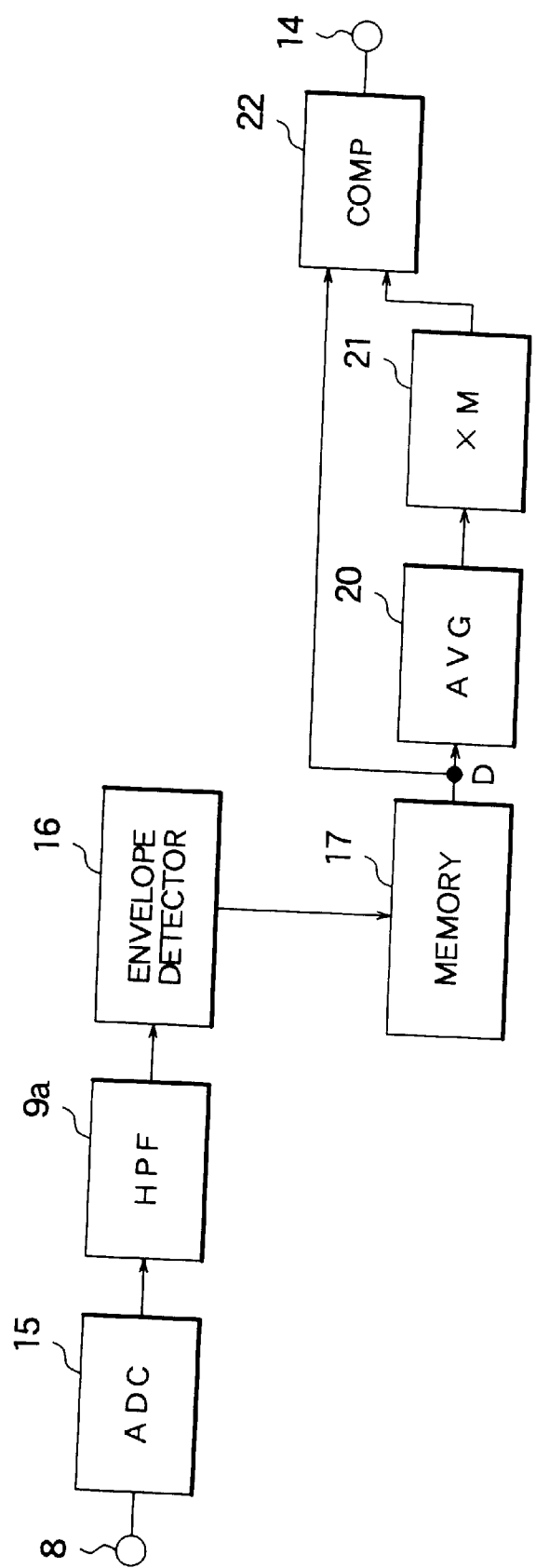
FIG. 3 is a block diagram of an impulse noise detector illustrating a first embodiment of the invention.

Referring to FIG. 3, a first embodiment of the invention has an analog input terminal 8 receiving an analog audio signal, in this case an FM composite signal, and an output terminal 14 from which an impulse noise detection signal is output. The first embodiment comprises an analog-to-digital converter (ADC) 15, a high-pass filter 9a, an envelope detector 16, a memory 17, an averager (AVG) 20, a multiplier 21, and a comparator (COMP) 22. The analog-to-digital converter 15 is a well-known hardware device. The other elements may be separate hardware devices, or software modules in a program executed by a computing device such as a microprocessor or digital signal processor (DSP).

Next, the operation of the first embodiment will be described.

The analog-to-digital converter 15 converts the FM composite signal received at the analog input terminal 8 to a digital signal for input to the high-pass filter 9a. The high-pass filter 9a attenuates frequency components up to at least 53 kHz, and passes the remaining high-frequency components to the envelope detector 16. Since the high-pass filter 9a attenuates all of the signal frequencies normally present in the FM composite signal, the output of the high-pass filter 9a is essentially a noise signal, the level of which is substantially unaffected by variations in the left-channel and right-channel audio signal levels.

The envelope detector 16 determines the amplitude level of the output of the high-pass filter 9a. Various methods of envelope detection can be employed. In one exemplary method, the envelope detector 16 squares the input data received from the high-pass filter 9a, performs a low-pass filtering operation on the squared values, and takes the square roots of the low-pass filtered values. In another exemplary method, the envelope detector 16 performs a low-pass filtering operation on the absolute values of the data received from the high-pass filter 9a. The data output from the envelope detector 16 are stored temporarily in the memory 17.

The signal input at the analog input terminal 8 always includes a certain amount of low-level background noise, and intermittently includes impulse noise. The background noise is generated by electronic components in the preceding circuits in the receiver, such as the tuner 2 and FM demodulator 3 shown in FIG. 1. Because of automatic gain control in the preceding circuits, the level of the background noise and impulse noise depends on the strength of the FM signal received at the antenna, but impulse noise that does not greatly exceed the background noise level is masked by the background noise and does not have to be blanked out. The first embodiment accordingly detects impulse noise by comparison with a threshold set in relation to the background noise level.

This comparison is made by the comparator 22, which compares each data value D stored in the memory 17 with a threshold set by the averager 20 and multiplier 21, drives the impulse noise detection signal to the active logic level if D exceeds the threshold, and drives the impulse noise detection signal to the inactive level if D does not exceed the threshold.

The averager 20 takes the average of the data values spanning a time interval preceding and following the data value D compared by the comparator 22, the interval being longer than the expected duration of impulse noise. An example of an appropriate interval is a two-millisecond interval extending one millisecond before and after the processing point of data D.

The multiplier 21 multiplies the average calculated by the averager 20 by a factor M, and supplies the result to the comparator 22 as the threshold value. The factor M should be high enough to avoid the unwanted detection of background noise, and of tone bursts and other abruptly rising signals that are more persistent than impulse noise. An example of an appropriate factor is four (M=4).

Figure 4:
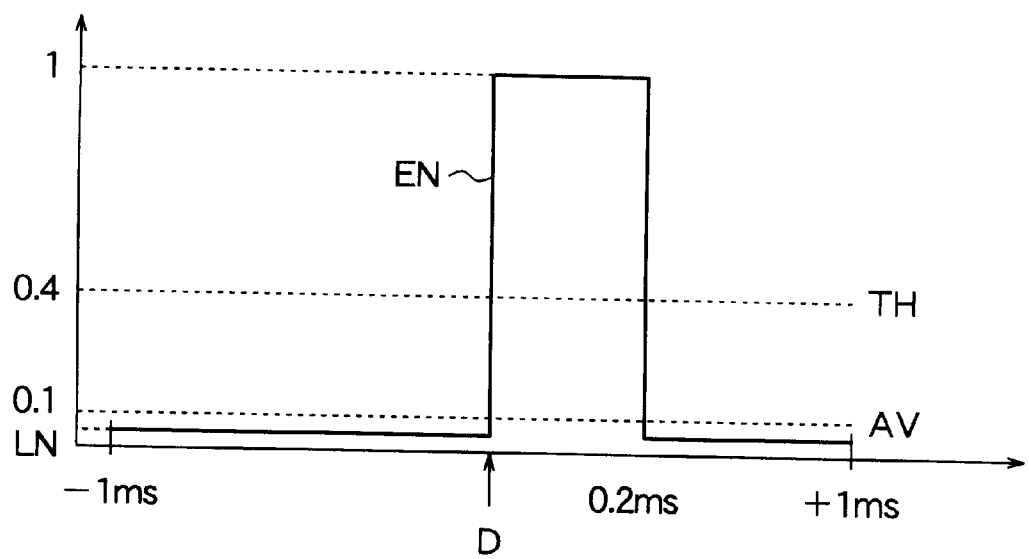
FIG. 4 is a graph illustrating the detection of impulse noise in the first embodiment.

FIG. 4 illustrates the detection of a noise impulse with a duration of 0.2 milliseconds, when the averaging interval is two milliseconds and M is equal to four. Time is indicated on the horizontal axis. Data values are indicated on the vertical axis, normalized so that the noise impulse has a level of unity. For simplicity, the envelope data EN stored in the memory 17 are shown as having a square waveform. The background noise level LN is close to zero. When the comparator 22 compares the data value at the leading edge of the noise impulse (D), the average data value AV in the surrounding two-millisecond interval is substantially equal to 0.1, and the threshold value TH set by the multiplier 21 is substantially 0.1×4, or 0.4. The data value D exceeds the threshold TH (1>0.4), so the impulse noise detection signal is activated.

As further data arrive from the envelope detector 16, the compared data value (D) and the surrounding two-millisecond interval are shifted forward on the time axis, and the same process is repeated. The process can be repeated at each new data value, or at intervals of two or more new data values. The impulse noise detection signal will remain active for substantially the 0.2-millisecond duration of the noise impulse, then become inactive as the processing point moves past the noise impulse and the data value falls below the threshold level again.

Figure 5:
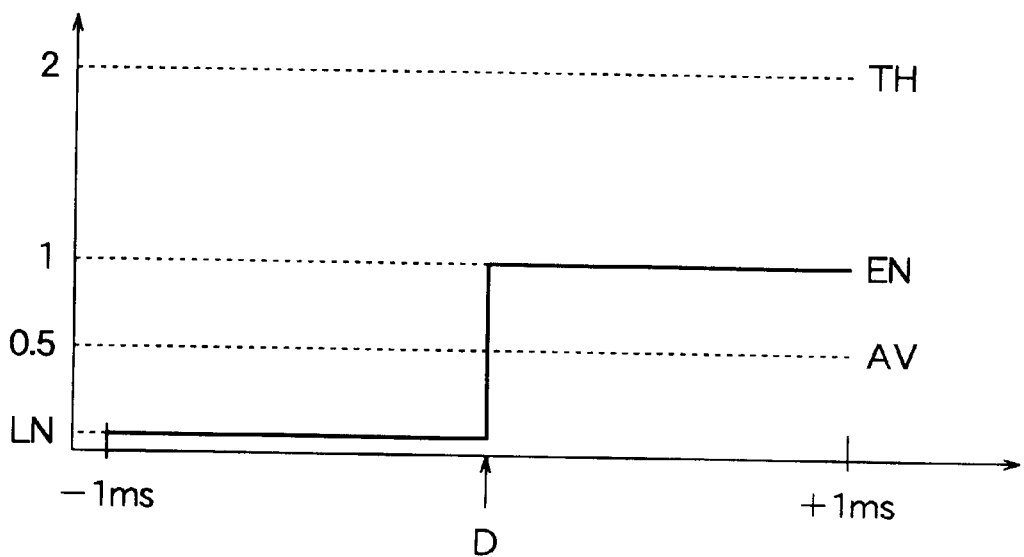
FIG. 5 is a graph illustrating the non-detection of a tone burst in the first embodiment.

FIG. 5 illustrates the response of the first embodiment to a tone burst lasting longer than one millisecond, using the same notation as in FIG. 4. The tone burst is shown as rising abruptly to a level of unity at the current processing point (data D). The average value (AV) calculated around this point is substantially 0.5, so the threshold level (TH) is substantially equal to two (0.5×4). The data value D is less than the threshold TH (1<2), so the impulse noise detection signal remains inactive. As the processing point shifts forward (to the right), the impulse noise detection signal will continue to remain inactive.

The first embodiment is accordingly able to detect short-duration impulse noise without mistakenly detecting tone bursts and other signals of longer duration that should not be removed from the FM composite signal, even if these signals rise abruptly.

In a variation of the first embodiment, the multiplier 21 multiplies the average value output from the averager 20 by one factor ($M_1$) if the impulse noise detection signal is currently inactive, and by another, smaller factor ($M_2$) if the impulse noise detection signal is currently active. For a given average value, the activation threshold of the impulse noise detection signal becomes higher than the deactivation threshold (because $M_1 > M_2$). This variation provides a desirable hysteresis effect that keeps the impulse noise detection signal from fluctuating between the active and inactive states when an impulse noise waveform fluctuates around the detection threshold while rising or falling.

In another variation of the first embodiment, the averaging interval is not shifted each time the compared data point D is shifted; the same average value is used during two or more comparisons. If the length of the averaging interval is two milliseconds, a new average value can be calculated once every millisecond, for example, or once every two milliseconds.

In another variation, the memory 17 is omitted and the averager calculates average values by, for example, a moving-average method.

In a further variation, the analog-to-digital converter 15 is omitted, and the high-pass filter 9a and envelope detector 16 are analog circuits. The averager 20, multiplier 21, and comparator 22 may also be analog circuits; alternatively, an analog-to-digital converter may be provided on the output side of the envelope detector 16.

These variations of the first embodiment also apply to the embodiments described below.

Next, a second embodiment will be described.

Figure 6:
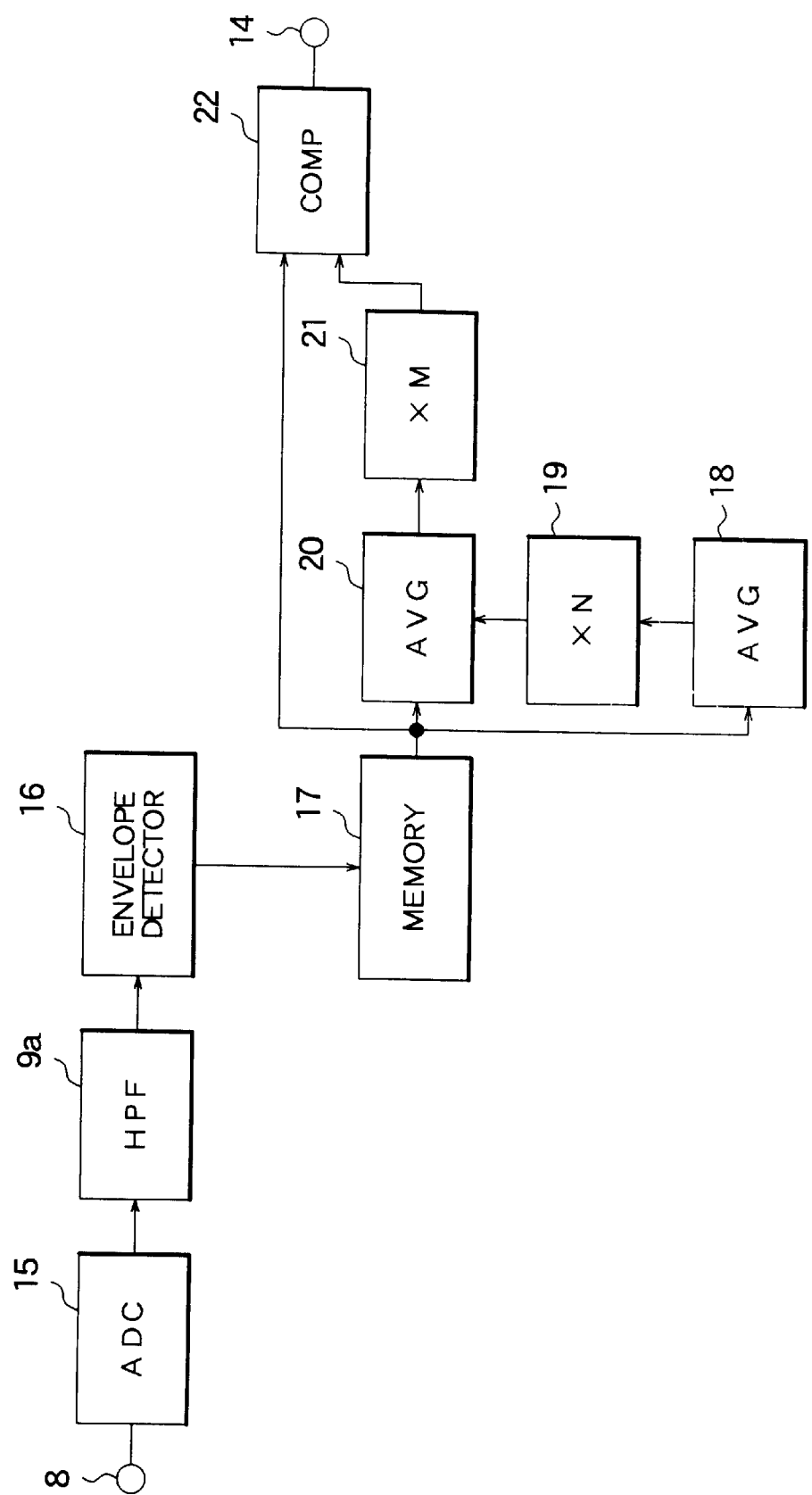
FIG. 6 is a block diagram of an impulse noise detector illustrating a second embodiment of the invention.

Referring to FIG. 6, the second embodiment comprises the elements described in the first embodiment. Except for the averager 20, these elements operate as in the first embodiment. The second embodiment also comprises an additional averager 18 and an additional multiplier 19. Averager 18 takes the average of the data values stored in the memory 17 over a predetermined interval. Multiplier 19 multiplies the resulting average by a constant factor N. Averager 20 re-calculates the average value of the data in the memory 17 over the same interval, using only data values equal to or less than the product output by multiplier 19. Multiplier 21 multiplies the average value output by averager 20 by a factor M to obtain the threshold supplied to the comparator 22.

Figure 7:
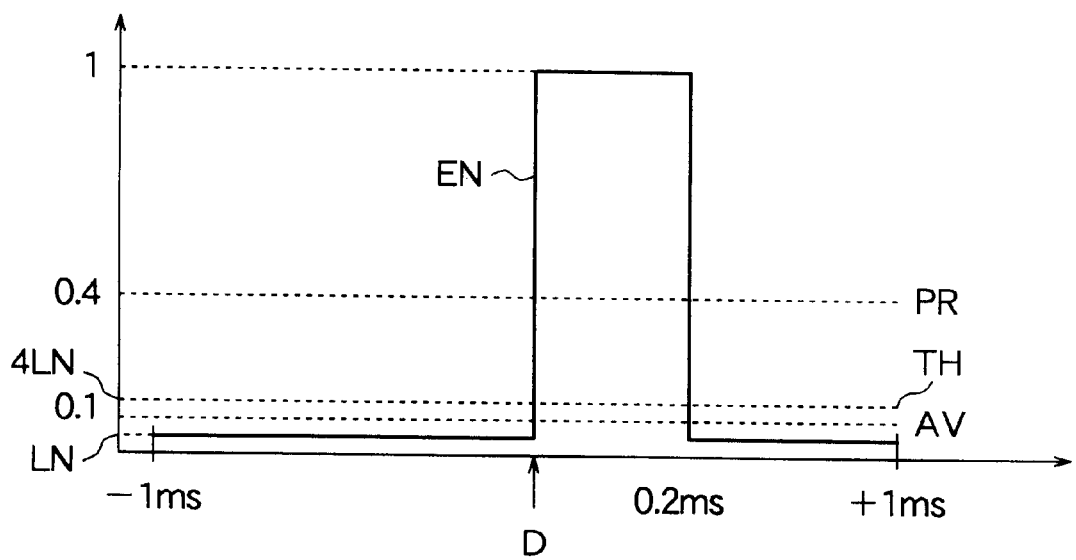
FIG. 7 is a graph illustrating the detection of impulse noise in the second embodiment.

FIG. 7 illustrates the operation of the second embodiment in detecting a 0.2-millisecond noise pulse in envelope data EN with a low background noise level LN, the horizontal axis representing time and the vertical axis representing signal level. The height of the noise pulse is again normalized to unity. The factors M and N are both equal to four. The average value AV calculated by averager 18 over the indicated two-millisecond interval on the horizontal axis is 0.1. The product PR output by multiplier 19 is equal to 0.4. Averager 20 selects and averages the data values equal to or less than 0.4 in the same two-millisecond interval. All such data values are equal to LN, making the average value calculated by averager 20 also equal to LN. The threshold TH calculated by multiplier 21 is equal to four times LN. The first data point D in the noise impulse exceeds this threshold TH, causing output of an active impulse noise detection signal as in the first embodiment.

Figure 8:
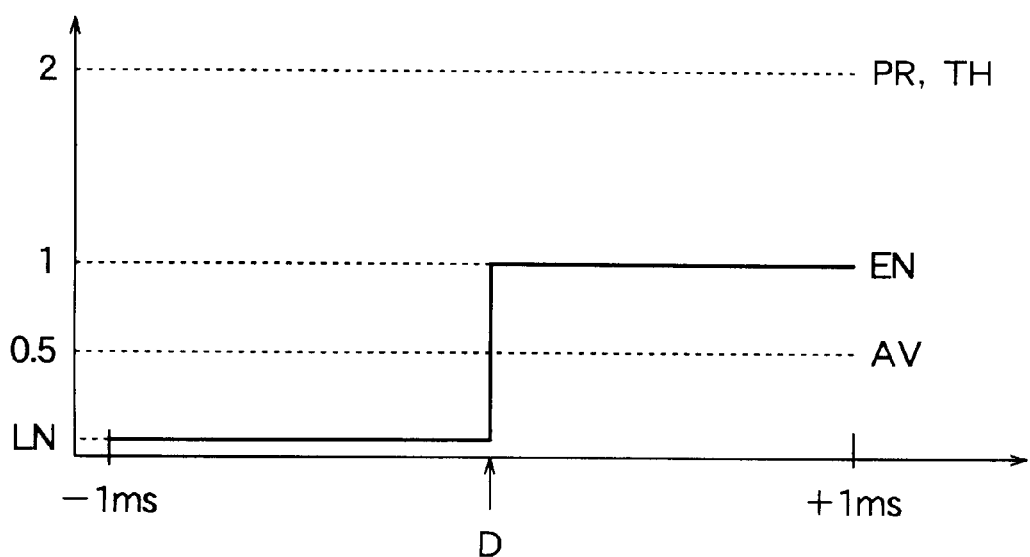
FIG. 8 is a graph illustrating the non-detection of a tone burst in the second embodiment.

FIG. 8 illustrates the response of the second embodiment to a tone burst lasting longer than one millisecond, using the same notation as in FIG. 7, the level of the tone burst being normalized to unity. Averager 18 calculates an average value AV of 0.5, which multiplier 19 multiplies by four to obtain a product PR equal to two. Averager 20 selects the data values less than PR, thus selecting all data values in the interval, and again calculates an average value of 0.5. Multiplier 21 multiplies this average by four, obtaining a threshold value TH again equal to two. The data value D is less than this threshold TH, so the impulse noise detection signal remains inactive.

Like the first embodiment, the second embodiment detects short-duration impulse noise without detecting abruptly rising signals of longer duration, such as tone bursts. For the idealized waveforms shown in FIGS. 7 and 8, the second embodiment produces the same results as the first embodiment, but in the general case, the second embodiment detects impulse noise more quickly and more sensitively than the first embodiment, because the threshold TH in the second embodiment is substantially unaffected by the noise impulses themselves.

Next, a third embodiment will be described.

Figure 9:
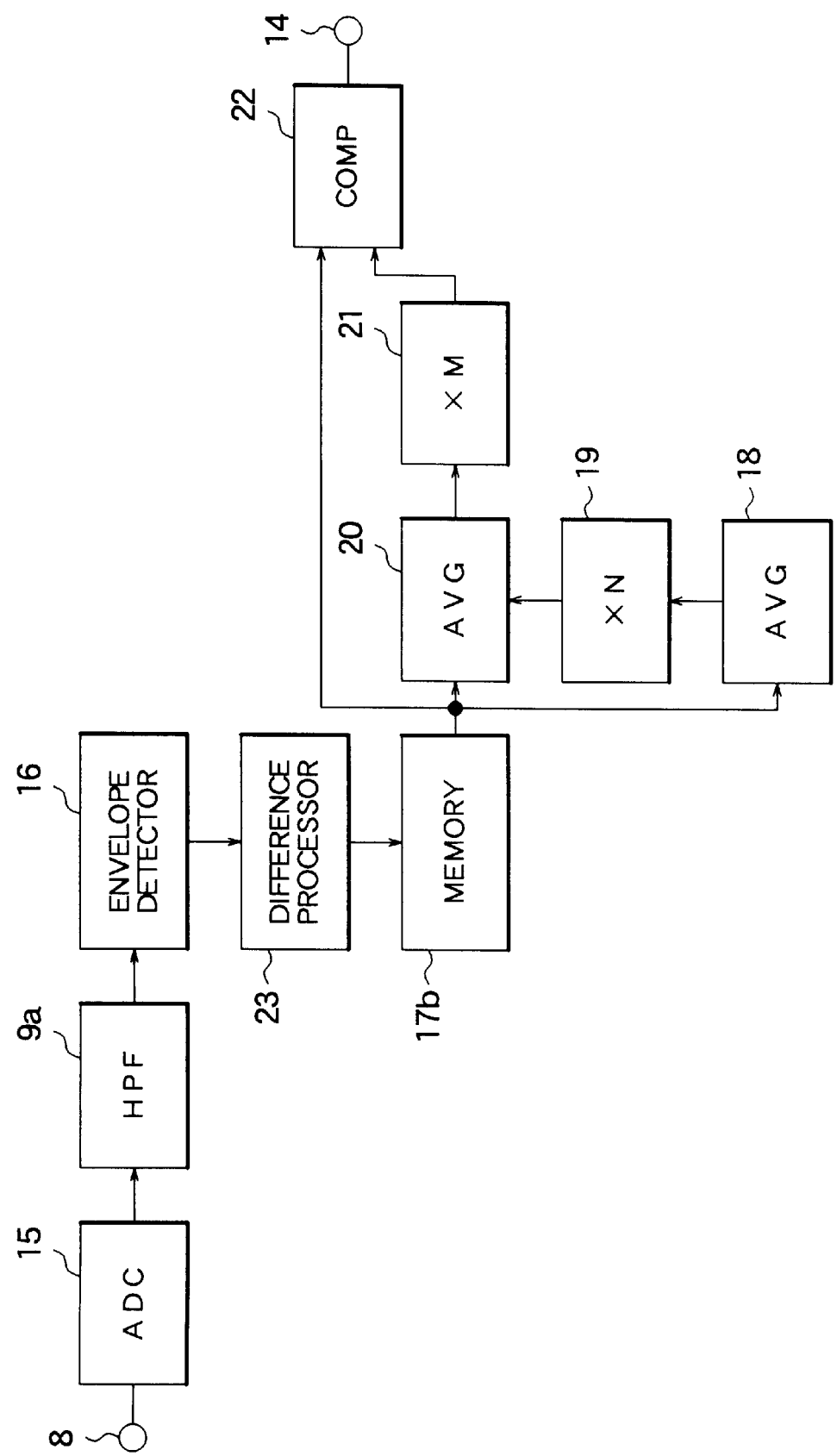
FIG. 9 is a block diagram of an impulse noise detector illustrating a third embodiment of the invention.

Referring to FIG. 9, the third embodiment inserts a difference processor 23 between the envelope detector and memory of the second embodiment, so that the memory 17b stores the output of the envelope detector 16 as processed by the difference processor 23, instead of directly storing the output of the envelope detector 16. The difference processor 23 takes the difference between each data value received from the envelope detector 16 and the n-th preceding data value, where n is a fixed positive integer, and performs another envelope detection process on the resulting differences.

The other elements of the third embodiment are identical to the corresponding elements in the second embodiment, and operate in the same way.

Figure 10:
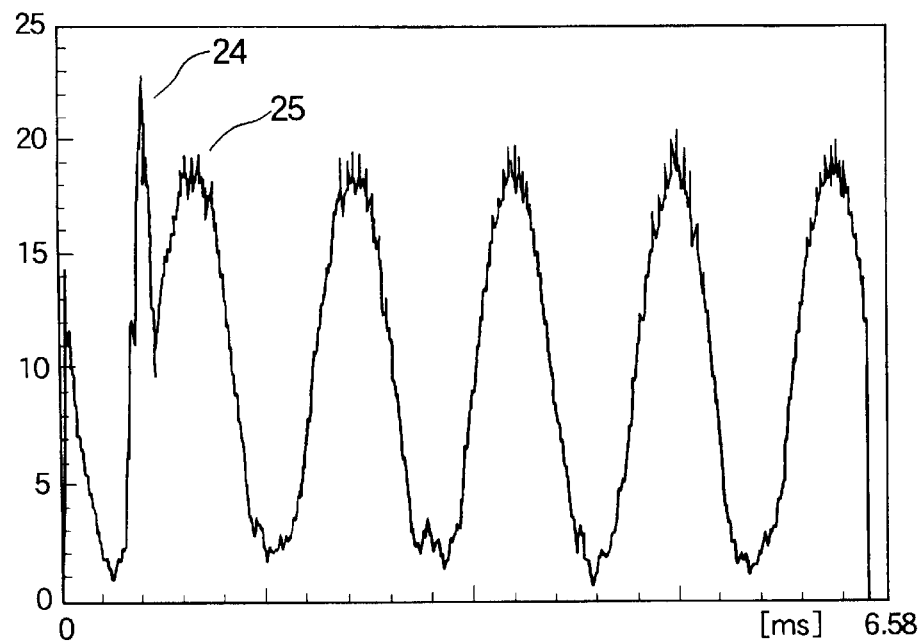
FIG. 10 is a graph illustrating impulse noise mixed with intermodulation products.
Figure 11:
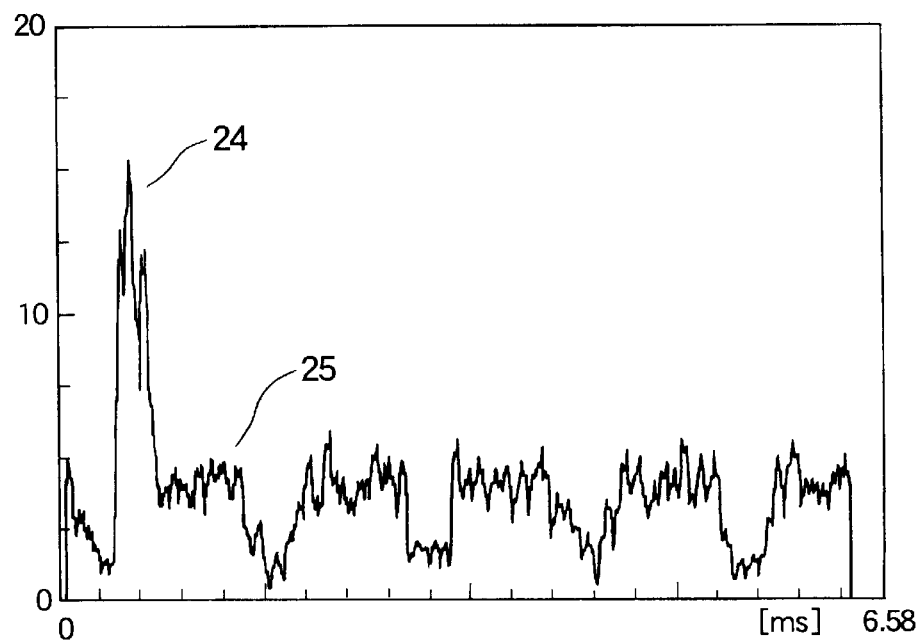
FIG. 11 is a graph illustrating the emphasis of the impulse noise by the difference processor in the third embodiment.

The effect of the difference processor 23 is to emphasize rapidly-changing signal components, such as impulse noise, relative to more slowly-changing components, such as components of the FM composite signal that leak into the high-frequency band through intermodulation distortion. FIG. 10 shows an example of an envelope waveform output by the envelope detector 16, including both impulse noise 24 and intermodulation products 25. FIG. 11 shows the same waveform after passage through the difference processor 23, which took the difference between each data point and the data value four points before (n=4). The rapid changes in the impulse noise 24 leave a strong peak in the envelope signal output by the difference processor 23, while the intermodulation products 25 are much attenuated.

By attenuating high-frequency intermodulation products and thereby emphasizing impulse noise, the third embodiment enables impulse noise to be detected accurately despite the leakage of intermodulation products from the audio components of the FM composite signal into the high-frequency noise band.

Next, a fourth embodiment will be described.

Figure 12:
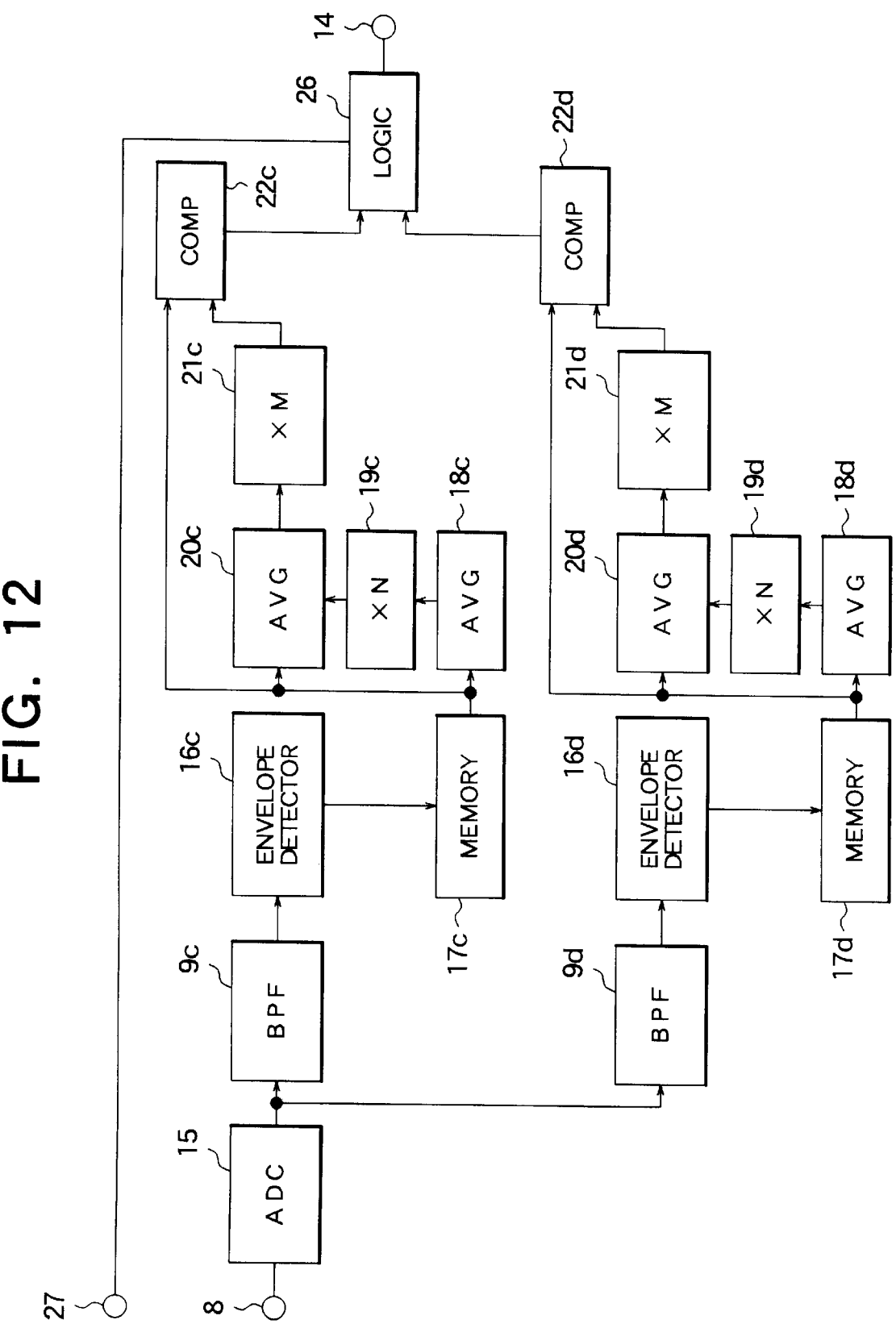
FIG. 12 is a block diagram of an impulse noise detector illustrating a fourth embodiment of the invention.

Referring to FIG. 12, the fourth embodiment supplies the output of the analog-to-digital converter 15 to a pair of bandpass filters (BPFs) 9c and 9d having different passbands. As one example, the first bandpass filter 9c has a passband centered at 90 kHz while the second bandpass filter 9d has a passband centered at 100 kHz, both passbands having a bandwidth of 10 kHz. The output of the first bandpass filter 9c is processed by an envelope detector 16c, a memory 17c, an averager 18c, a multiplier 19c, another averager 20c, another multiplier 21c, and a comparator 22c, which are identical to the corresponding elements in the second embodiment. The output of the second bandpass filter 9d is likewise processed by an envelope detector 16d, a memory 17d, an averager 18d, a multiplier 19d, another averager 20d, another multiplier 21d, and a comparator 22d identical to the corresponding elements in the second embodiment. The two comparators 22c and 22d output respective detection signals as described above.

The outputs of the two comparators 22c and 22d are supplied to an output logic processor 26, which supplies an output impulse noise detection signal to the output terminal 14. The output logic processor 26 also receives an indicator signal from a digital input terminal 27, indicating the level of the radio-frequency FM broadcast signal received at the antenna. In the fourth embodiment, the indicator signal is preferably a one-bit signal that is active when the received level of the broadcast signal exceeds a predetermined level.

When the indicator signal is active, the output logic processor 26 performs OR logic on the inputs from the two comparators 22c, 22d, activating the impulse noise detection signal when the output of either one (or both) of the comparators is active. When the indicator signal is inactive, the output logic processor 26 performs AND logic, activating the impulse noise detection signal only when the inputs from both comparators 22c, 22d are active. The output logic processor 26 accordingly activates the output impulse noise detection signal when at least two signals among the indicator signal, the output of the first comparator 22c, and the output of the second comparator 22d are active.

When the received radio-frequency signal level is high, the amplifiers in the front end of the receiver (not visible) are set to a comparatively low gain, reducing the amplitude of impulse noise picked up by the antenna in relation to the level of background noise generated by subsequent receiver circuits, thereby making the impulse noise harder to detect. The frequency spectrum of impulse noise fluctuates rapidly, however, while the spectrum of the background noise changes little over time. As a result, while the impulse noise may not be detected in the outputs of both bandpass filters 9c and 9d simultaneously, it is generally detectable in the output of one bandpass filter or the other.

When the received radio-frequency signal level is low, the front-end amplifiers operate at a comparatively high gain, and when impulse noise is present, it is readily detectable in the passbands of both bandpass filters at once. If the amplifier gain is high enough, however, comparator 22c or comparator 22d may also begin to detect system noise generated by, for example, a microprocessor controlling a display device or performing other control functions in the radio receiver. This type of system noise is weaker than the impulse noise generated by, for example, an automobile ignition system, and is more restricted in frequency. Thus if system noise is detected at all, it is generally detected by only one of the two comparators 22c and 22d.

By performing OR logic when the received signal level is high and performing AND logic when the received signal level is low, the output logic processor 26 is able to detect impulse noise mixed with a strong received FM broadcast signal, without detecting system noise at low received FM signal levels.

Next, a fifth embodiment will be described.

Figure 13:
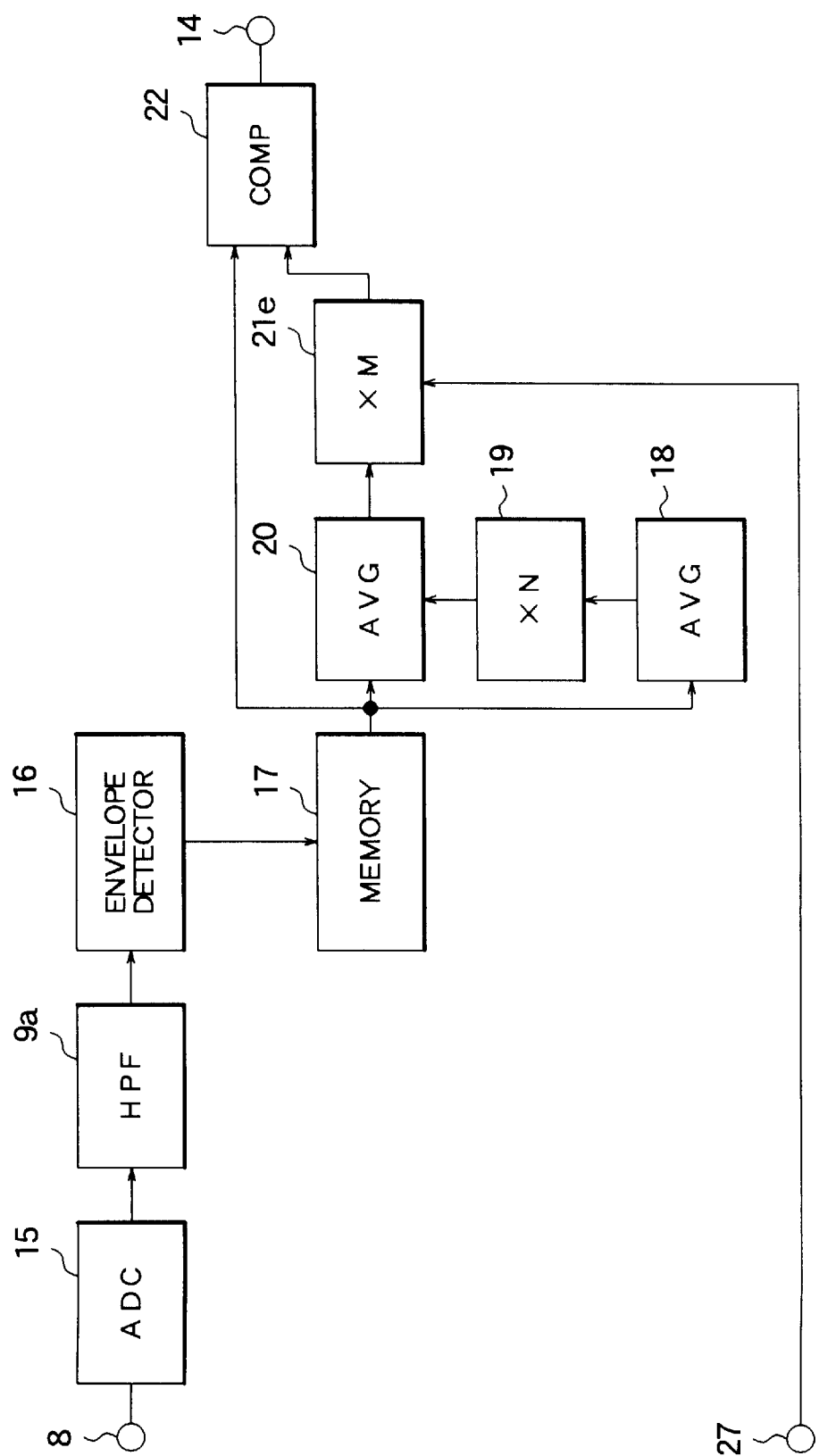
FIG. 13 is a block diagram of an impulse noise detector illustrating a fifth embodiment of the invention.

Referring to FIG. 13, the fifth embodiment comprises the same elements as in the second embodiment, but provides the second multiplier 21e with an indicator signal from the digital input terminal 27 described in the fourth embodiment, indicating the received signal level at the antenna. The multiplier 21e adjusts the value of the factor M in an inverse relation to the indicator signal, using a large value of M when the received signal level is low, and a small value of M when the received signal level is high.

As explained in the fourth embodiment, when the received signal level is high, front-end amplifier gain is reduced, thereby reducing the level of externally-generated impulse noise in relation to internally-generated background noise. By reducing the factor M in this situation, the fifth embodiment reduces the detection threshold, so that impulse noise can still be detected with adequate sensitivity.

When the received signal level is low, front-end amplifier gain is increased, creating a risk that the comparator 22 might detect not only impulse noise, but also system noise and other non-impulsive environmental noise. By increasing the factor M in this case, the fifth embodiment increases the detection threshold, so that only strong impulse noise such as ignition noise is detected.

As a result, the fifth embodiment is able to detect impulse noise accurately over a wider range of received FM signal levels than the second embodiment.

The indicator signal received at the digital input terminal 27 in the fifth embodiment need not be a one-bit signal. The indicator signal can be a multiple-bit signal indicating the received FM signal level in a substantially continuous manner, and the factor M can be varied in a substantially continuous manner in response to the received signal level.

Next, a sixth embodiment will be described.

Figure 14:
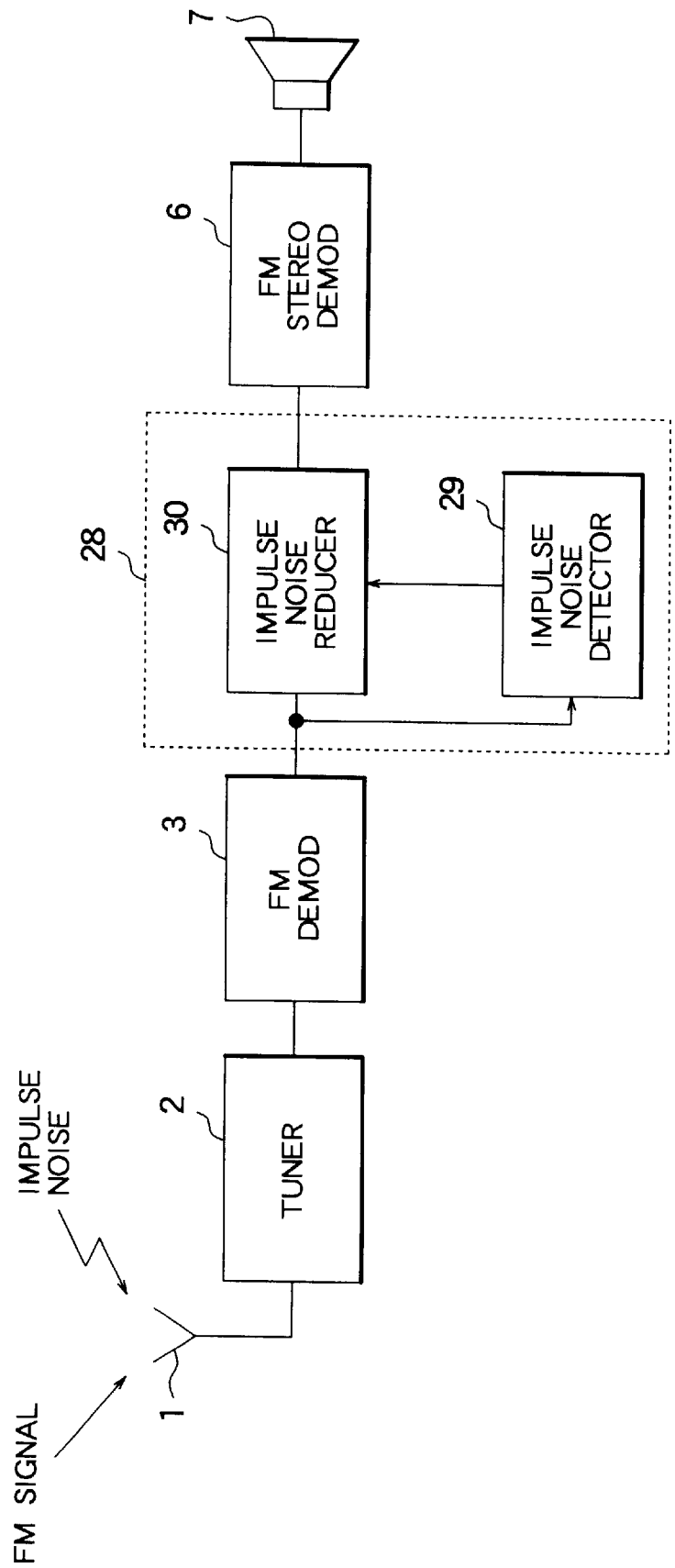
FIG. 14 is a block diagram of an FM stereo radio receiver with a noise reduction system illustrating a sixth embodiment of the invention.

Referring to FIG. 14, the sixth embodiment is a noise reduction system 28 comprising the impulse noise detector 29 of the first embodiment and an impulse noise reducer 30. This noise reduction system 28 can be used in a radio receiver comprising an antenna 1, a tuner 2, an FM demodulator 3, an FM stereo demodulator 6, and a pair of loudspeakers 7, as shown, or in various other types of equipment in which impulse noise must be suppressed. In response to the impulse noise detection signal output by the impulse noise detector 29, the impulse noise reducer 30 attenuates or blocks the input received from, for example, the FM demodulator 3, and provides the attenuated signal or a substitute signal to, for example, the FM stereo demodulator 6. The impulse noise detector 29 and noise reducer 30 may be combined into a single integrated circuit.

The sixth embodiment provides the advantages noted in the first embodiment. In a variation of the sixth embodiment, the impulse noise detector of the second, third, fourth, or fifth embodiment is used.

As described above, by using a detection threshold obtained from the average of data values over an interval, the first embodiment detects short-duration impulse noise while ignoring other abruptly rising signals. By repeating the averaging process, the second embodiment obtains a detection threshold that is not affected by the noise impulses the detector is seeking to detect. By inserting a difference processor in the envelope detection process, the third embodiment detects impulse noise accurately despite the presence of leakage from the audio components of the analog audio signal. By detecting impulse noise separately in two separate frequency bands, the fourth embodiment detects impulse noise accurately at both high and low received radio-frequency signal levels, without detecting system noise. By varying the threshold multiplier M according to the received signal level, the fifth embodiment also detects impulse noise accurately at both high and low received radio-frequency signal levels without detecting system noise. The sixth embodiment provides a noise reduction system with advantages similar to the above.

These features of the preceding embodiments can be combined in ways other than those illustrated in the drawings.

The input signal in which impulse noise is detected need not be an FM composite signal.

Those skilled in the art will recognize that further variations are possible within the scope claimed below.

What is claimed is:

1. A method of detecting impulse noise in an input signal, comprising the steps of:
   (a) filtering said input signal to reject at least frequency components below a predetermined frequency, thereby producing a filtered signal;
   (b) detecting an envelope of said filtered signal, thereby producing an envelope signal;
   (c) calculating a first average value of at least some values of said envelope signal over a predetermined time interval;
   (d) multiplying said first average value by a first factor, thereby producing a threshold value;
   (e) comparing at least one value of said envelope signal in said predetermined time interval with said threshold value;
   (f) activating an impulse noise detection signal if the compared value exceeds said threshold value; and
   (g) de-activating said impulse noise detection signal if the compared value does not exceed said threshold value.

2. The method of claim 1, further comprising the steps of:
   (h) increasing said first factor when said impulse noise detection signal becomes inactive; and
   (i) decreasing said first factor when said impulse noise detection signal becomes active.

3. The method of claim 1, further comprising the steps of:
   (j) calculating a second average value of all of the values of said envelope signal in said predetermined time interval;
   (k) multiplying said second average value by a second factor, thereby producing a product value; and
   (l) selecting the values of said envelope signal less than said product value for use in calculating said first average value in said step (c).

4. The method of claim 1, wherein said step (b) further comprises the steps of:
   (m) detecting a preliminary envelope of said filtered signal;
   (n) taking differences between values in said preliminary envelope, thereby producing a difference signal; and
   (o) detecting an envelope of said difference signal, thereby producing said envelope signal.

5. The method of claim 1, wherein said input signal is obtained from a radio-frequency signal received at an antenna, and said step (a) employs a bandpass filter with a passband above said predetermined frequency, further comprising the steps of:
   (p) changing the passband of said bandpass filter and repeating said steps (a) to (g), so that a first value of said impulse noise detection signal is obtained using one passband in said step (a), and a second value of said impulse noise detection signal is obtained using another passband when said step (a) is repeated;
   (q) combining said first value and said second value by a first logic operation, when said radio-frequency signal has a received level exceeding a predetermined level, to obtain an output value of said impulse noise detection signal that is active when at least one of said first value and said second value is active; and
   (r) combining said first value and said second value by a second logic operation, when the received level of said radio-frequency signal Is less than said predetermined level, to obtain an output value of said impulse noise detection signal that is active only when both said first value and said second value are active.

6. The method of claim 1, wherein said input signal is obtained from a radio-frequency signal received at an antenna, further comprising the step of:
   (s) adjusting said first factor according to a received level of said radio-frequency signal.

7. The method of claim 1, wherein said input signal is an FM composite signal.

8. An impulse noise detector for detecting impulse noise in an input signal, comprising:
   a filter filtering said input signal to reject at least frequency components below a predetermined frequency, thereby producing a filtered signal;
   an envelope detector coupled to said filter, detecting an envelope of said filtered signal, thereby producing an envelope signal;
   a first averager coupled to said envelope detector, calculating a first average value of at least some values of said envelope signal over a predetermined time interval;
   a first multiplier coupled to said first averager, multiplying said first average value by a first factor, thereby producing a threshold value; and
   a comparator coupled to said first multiplier, comparing at least one value of said envelope signal in said predetermined time interval with said threshold value, activating an impulse noise detection signal if the compared value exceeds said threshold value, and de-activating said impulse noise detection signal if the compared value does not exceed said threshold value.

9. The impulse noise detector of claim 8, wherein said first multiplier increases said first factor when said impulse noise detection signal becomes inactive, and decreases said first factor when said impulse noise detection signal becomes active.

10. The impulse noise detector of claim 8, further comprising:
    a memory coupled to said envelope detector, storing said envelope signal;
    a second averager coupled to said memory, calculating a second average value of all of the values of said envelope signal in said predetermined time interval; and
    a second multiplier coupled to said second averager, multiplying said second average value by a second factor, thereby producing a product value; wherein
    said first averager selects the values of said envelope signal less than said product value for use in calculating said first average value.

11. The impulse noise detector of claim 8, wherein said envelope detector comprises:

a preliminary detector detecting a preliminary envelope of said filtered signal; and a difference processor taking differences between values in said preliminary envelope, thereby producing a difference signal, and detecting an envelope of said difference signal, thereby producing said envelope signal.

12. The impulse noise detector of claim 8, wherein said input signal is obtained from a radio-frequency signal received at an antenna, and said first multiplier adjusts said first factor according to a received level of said radio-frequency signal.

13. The impulse noise detector of claim 8, wherein said input signal is an FM composite signal.

14. An impulse noise detector for detecting impulse noise in an input signal derived from a radio-frequency signal received at an antenna, comprising:

a first bandpass filter having a first passband, filtering said input signal to produce a first filtered signal;

a first envelope detector coupled to said first filter, detecting an envelope of said first filtered signal, thereby producing a first envelope signal;

a first averager coupled to said first envelope detector, calculating a first average value of at least some values of said first envelope signal over a predetermined time interval;

a first multiplier coupled to said first averager, multiplying said first average value by a first factor, thereby producing a first threshold value;

a first comparator coupled to said first multiplier, comparing at least one value of said first envelope signal in said predetermined time interval with said first threshold value, activating a first detection signal if the compared value exceeds said first threshold value, and de-activating said first detection signal if the compared value does not exceed said first threshold value;

a second bandpass filter having a second passband different from said first passband, filtering said input signal to produce a second filtered signal;

a second envelope detector coupled to said second filter, detecting an envelope of said second filtered signal, thereby producing a second envelope signal;

a second averager coupled to said second envelope detector, calculating a second average value of at least some values of said second envelope signal over said predetermined time interval;

a second multiplier coupled to said second averager, multiplying said second average value by said first factor, thereby producing a second threshold value;

a second comparator coupled to said second multiplier, comparing at least one value of said second envelope signal in said predetermined time interval with said second threshold value, activating a second detection signal if the compared value exceeds said second threshold value, and de-activating said second detection signal if the compared value does not exceed said second threshold value;

an input terminal receiving an indicator signal that is active when said radio-frequency signal has a received level exceeding a predetermined level; and a logic circuit coupled to said first comparator, said second comparator and said input terminal, activating an impulse noise detection signal when at least two of said indicator signal, said first detection signal, and said second detection signal are active.

15. The impulse noise detector of claim 14, wherein said first multiplier and said second multiplier increase said first factor when said impulse noise detection signal becomes inactive, and decrease said first factor when said impulse noise detection signal becomes active.

16. The impulse noise detector of claim 14, further comprising:

a first memory coupled to said first envelope detector, storing said first envelope signal;

a third averager coupled to said first memory, calculating a third average value of all of the values of said first envelope signal in said predetermined time interval;

a third multiplier coupled to said third averager, multiplying said third average value by a second factor, thereby producing a first product value;

a second memory coupled to said first envelope detector, storing said second envelope signal;

a fourth averager coupled to said second memory, calculating a fourth average value of all of the values of said second envelope signal in said predetermined time interval; and a fourth multiplier coupled to said fourth averager, multiplying said fourth average value by said second factor, thereby producing a second product value; wherein said first averager selects the values of said first envelope signal less than said first product value for use in calculating said first average value; and said second averager selects the values of said second envelope signal less than said second product value for use in calculating said second average value.

17. The impulse noise detector of claim 14, wherein said analog audio signal is an FM composite signal.

18. A noise reduction system for reducing noise in an input signal, comprising:

a filter filtering said input signal to reject at least frequency components below a predetermined frequency, thereby producing a filtered signal;

an envelope detector coupled to said filter, detecting an envelope of said filtered signal, thereby producing an envelope signal;

a first averager coupled to said envelope detector, calculating a first average value of at least some values of said envelope signal over a predetermined time interval;

a first multiplier coupled to said first averager, multiplying said first average value by a first factor, thereby producing a threshold value;

a comparator coupled to said first multiplier, comparing at least one value of said envelope signal in said predetermined time interval with said threshold value, activating an impulse noise detection signal if the compared value exceeds said threshold value, and de-activating said impulse noise detection signal if the compared value does not exceed said threshold value; and a noise reducer coupled to said comparator, passing said input signal when said impulse noise detection signal is inactive, and blocking said input signal when said impulse noise rejection signal is active.

19. The noise reduction system of claim 18, wherein said first multiplier increases said first factor when said impulse noise detection signal becomes inactive, and decreases said first factor when said impulse noise detection signal becomes active.

20. The noise reduction system of claim 18, further comprising:

a memory coupled to said envelope detector, storing said envelope signal;

a second averager coupled to said memory, calculating a second average value of all of the values of said envelope signal in said predetermined time interval; and a second multiplier coupled to said second averager, multiplying said second average value by a second factor, thereby producing a product value; wherein said first averager selects the values of said envelope signal less than said product value for use in calculating said first average value.

21. The noise reduction system of claim 18, wherein said envelope detector comprises:

a preliminary detector detecting a preliminary envelope of said filtered signal; and a difference processor taking differences between values in said preliminary envelope, thereby producing a difference signal, and detecting an envelope of said difference signal, thereby producing said envelope signal.

22. The noise reduction system of claim 18, wherein said input signal is obtained from a radio-frequency signal received at an antenna, and said first multiplier adjusts said first factor according to a received level of said radio-frequency signal.

23. The noise reduction system of claim 18, wherein said input signal is an FM composite signal.

* * * * *